United States Patent [19]
Jarema et al.

[11] Patent Number: 5,944,908
[45] Date of Patent: *Aug. 31, 1999

[54] CLEANING COMPOSITIONS AND PROCESSES SUITABLE FOR REPLACING GRIT BLASTING TO CLEAN METAL MOLD SURFACES FOR PLASTICS

[75] Inventors: Chester P. Jarema, Sterling Heights; Michael A. Stuart, Davison, both of Mich.

[73] Assignee: Henkel Corporation, Gulph Mills, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,461

[22] Filed: Oct. 10, 1996

[51] Int. Cl.⁶ .......................................................... B08B 9/08
[52] U.S. Cl. .......................... 134/2; 134/22.1; 134/22.16; 134/22.17; 134/22.19; 510/245; 510/246; 510/254; 510/272; 264/39
[58] Field of Search ........................... 134/2, 22.1, 22.16, 134/22.17, 22.19; 264/39; 510/245, 246, 254, 272

[56] References Cited

U.S. PATENT DOCUMENTS

| | | | |
|---|---|---|---|
| 4,345,949 | 8/1982 | Park et al. | 134/22.16 |
| 5,215,675 | 6/1993 | Wilkins et al. | |
| 5,421,906 | 6/1995 | Borah | |
| 5,498,293 | 3/1996 | Ilardi et al. | |
| 5,552,089 | 9/1996 | Misselyn et al. | 510/244 |
| 5,573,702 | 11/1996 | Bonnechere et al. | 510/245 |
| 5,634,979 | 6/1997 | Carlson et al. | 134/3 |

*Primary Examiner*—Jan Ludlow
*Attorney, Agent, or Firm*—Ernest G. Szoke; Wayne C. Jaeschke; Norvell E. Wisdom, Jr.

[57] ABSTRACT

Residue that accumulates on metallic molding surfaces during repeated molding of plastics such as PVC can be removed by cleaning with an aqueous solution of a glycol or oligo-glycol monoether, an amine, and a chelating agent. The cleaner is sufficiently effective to replace mechanical blasting that was previously required.

16 Claims, No Drawings

CLEANING COMPOSITIONS AND PROCESSES SUITABLE FOR REPLACING GRIT BLASTING TO CLEAN METAL MOLD SURFACES FOR PLASTICS

BACKGROUND OF THE INVENTION

1. Field of the Invention

This invention relates to compositions and processes for removing residues that accumulate, during repeated use, on the surfaces of metal molds used for molding of plastics from powder or sheet form into coherent, macroscopic, shaped solid objects. The invention particularly relates to cleaning such molds used for poly{vinyl chloride} (hereinafter usually abbreviated as "PVC") and similar plastics that require relatively high molding temperatures.

2. Discussion of Related Art

At least the molding surfaces of metal molds for plastics fabrication are usually constituted of nickel, chromium, and/or stainless steel with a high content of nickel and/or chromium. Furthermore, these molding surfaces when new have a specific surface texture that it is desired to impart to the plastic objects being molded with them. For example, a mold surface may be highly polished to produce a smooth and glossy surface on objects molded with it, or it may have a microtexture deliberately designed to minimize gloss, reflectivity, and/or slippperiness, as is true for many of the plastic objects molded for use in automobiles, where avoidance of any sun glare is desired for such items as dashboards and a non-slippery grip is desired for steering wheels.

It is known that, when metal molds are used repeatedly to mold plastic objects, solid residues remain on the metal mold surface after the objects molded have been discharged from the molds. Although the residues are generally presumed to consist of constituents of the plastic molding composition and/or of products of chemical reaction among such constituents or among the constituents and the metal itself, the chemical nature of the residues is not usually known in detail.

Eventually the accumulation of residues reaches a sufficient volume on some part of the molding surface that the plastic objects molded therewith no longer satisfy surface texture requirements, and then the residues must be removed before use of the mold surface bearing such accumulated residue can be effectively continued. In many instances in commercial practice, no completely satisfactory chemical cleaner to remove such molding residues has been known, and the only effective method of cleaning has been mechanical, usually blasting with grit or like materials. Such blasting normally requires removing the molding surface from its place of normal use to another area where blasting is performed, and thereby necessitates the substitution of an alternative molding surface if production of molded plastic objects is to be continued, as is normally preferred, while the blasting is carried out. Furthermore, the blasting itself can eventually damage the mold surface. Thus the entire process is inefficient compared to the kind of chemical cleaning which is available for many other types of soiled metal objects.

DESCRIPTION OF THE INVENTION

Objects of the Invention

One major object of the invention is to provide compositions and processes that achieve more efficient cleaning of metal mold surfaces used for molding plastic objects. Other objects will become apparent from the description below.

General Principles of Description

Except in the claims and the operating examples, or where otherwise expressly indicated to the contrary, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, amount, fraction of, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); and the term "mole" and its grammatical variations may be applied to elemental, ionic, and any other chemical species defined by number and type of atoms present, as well as to compounds with well defined molecules.

SUMMARY OF THE INVENTION

Compositions according to the invention may be working compositions, which are suitable for direct use in stripping processes, or they may be concentrates, which contain some or all of the active ingredients of working compositions and are suitable for preparing working compositions by dilution with water and/or mixing with other concentrates. In many instances, concentrates for one application also may effectively be used directly as working compositions for other applications. Working compositions according to the invention are liquid at 25° C. under normal atmospheric pressure and comprise, preferably consist essentially of, or more preferably consist of, water and the following dissolved and/or stably dispersed components:

(A) a component selected from the group consisting of monoethers of:
  (i) ethylene glycol,
  (ii) propylene glycol,
  (iii) butylene glycol, and
  (iv) condensation oligomers of ethylene glycol, propylene glycol, and butylene glycol, said condensation oligomers being defined for the purposes of this specification as molecules that conform to general chemical formula I:

$$\text{HO}-(C_xH_{2x}O)_n-C_yH_{2y}-\text{OH} \qquad (I),$$

wherein x represents one of the integers 2, 3, or 4 and for each $C_xH_{2x}O$ moiety may be the same as or different from its value in any other $C_xH_{2x}O$ moiety in the general formula; y represents one of the integers 2, 3, or 4; and n represents one of the integers from 1 to 5;

(B) a component of amine molecules; and
(C) a component of molecules that are sequestering agent for metal ions, said sequestering agent molecules being selected from the group consisting of organic molecules that include at least two moieties each selected from the group consisting of carboxyl, carboxylate, keto, aldehydo, hydroxyl, amino, substituted amino, and nitrile moieties, said two moieties being separated from each other within said molecules by at least two atoms in said molecules that are not part of said moieties; and, optionally, one or more of the following components:
(D) a component of surfactant (alternatively described as "wetting agent") molecules that are not part of any of the previously recited components;
(E) a component of alkaline inorganic salts selected from the group consisting of hydroxides, phosphates and acid phosphates (including condensed phosphates and acid condensed phosphates), borates and acid borates (including condensed borates and acid condensed borates), carbonates and acid carbonates, and silicates and acid silicates (including condensed silicates and acid condensed silicates) of hydroxylamine, hydrazine, ammonia, alkali metals, and alkaline earth metals;
(F) coloring agents that are not part of any of the previously recited components;
(G) hydrotroping agents that are not part of any of the previously recited components; and
(H) organic compounds that are liquid at 25° C. under normal atmospheric pressure and are not part of any of the previously recited components.

Preferably, concentrate compositions according to the invention have the same constituents as noted above for working compositions, but concentrates may omit some of the ingredients in order to avoid storage instability. In such instances, if one of the three necessary ingredients listed above is omitted, mixing of at least two distinct types of concentrates will be required to prepare a working composition according to the invention. Processes of utilizing working compositions according to the invention as defined above for cleaning molding residues from metal surfaces used to mold plastics are another embodiment of the invention.

DESCRIPTION OF PREFERRED EMBODIMENTS

It is normally preferred that compositions according to the invention as defined above should be substantially free from various ingredients. Specifically, it is increasingly preferred in the order given, independently for each preferably minimized component listed below, that compositions according to the invention, when directly contacted with residues on metal in a process according to this invention, contain no more than 10, 5, 3, 2.0, 1.0, 0.35, 0.10, 0.08, 0.04, 0.02, 0.01, 0.001, or 0.0002 percent of any of (i) any compound identified as carcinogenic and (ii) any other compound, except water, that has a vapor pressure at 100° C. that exceeds, with increasing preference in the order given, 500, 300, 200, 100, 70, 50, 30, 15, 10, 7, 5, 3, 1.5, or 0.7 millibars.

Component (A) above is preferably selected from monoethers of molecules conforming to general formula I given above when, independently for each preference noted: (1) n is not more than, with increasing preference in the order given, 5, 4, 3, 2, or 1; (2) x represents the same integer in each $C_xH_{2x}O$ moiety in the general formula and is the same as y; (3) x is either 2 or 3, more preferably 3; and (4) y is either 2 or 3, more preferably 3. Also, and independently of the other noted preferences, component (A) is preferably selected from molecules in which all parts of each molecule, except for a moiety conforming to general formula II:

$$-O-(C_xH_{2x}O)_n-C_yH_{2y}-OH \qquad (II),$$

where x, n, and y all have the same meanings as for general formula I, constitute an alkyl group; and, independently, component (A) is selected from molecules in which the total number of carbon atoms is at least, with increasing preference in the order given, 4, 5, 6, or 7 and independently preferably is not more than, with increasing preference in the order given, 15, 12, 11, 10, 9, or 8 carbon atom(s).

The concentration of component (A) in a working composition according to the invention may vary over quite wide limits. Generally, faster cleaning will be achieved with higher concentrations of component (A), with all other factors equal. On the other hand, it is often difficult or impractical to reclaim component (A) when used, so that for economic reasons the concentration should not be substantially higher than needed. Generally, the concentration of component (A) preferably is, with increasing preference in the order given, at least 1.0, 3.0, 5.0, 7.0, 8.0, 9.0, 10.0, 11.0, 11.5, or 12.0% and independently, primarily for reasons of economy, preferably is not more than 80, 65, 50, 40, 35, 30, 25, 20, 18, 16, 14, or 13.0% of the total working composition.

Component (B) preferably is selected from molecules that contain, bonded to a nitrogen atom within the molecule, at least, with increasing preference in the order given, 1, 2, or 3 moieties each conforming to general formula III:

$$HO-C_2H_{2z}- \qquad (III),$$

where z represents a positive integer that, if there is more than one such moiety in the molecule, may be the same or different as that represented by z in another moiety conforming to general formula III. Independently, z preferably is not more than, with increasing preference in the order given, 10, 8, 6, 5, 4, 3, or 2. Lower values of z are preferred at least in part for economy, because compounds with lower values for z are generally cheaper than those with higher values of z; such compounds are also more soluble in water and more likely to be liquid at normal ambient temperature and pressure and therefore more easily removed when cleaning is complete, but are still low enough in volatility to avoid any severe odor nuisance from their presence.

It is believed that at least one function of component (B) is to provide alkalinity to the aqueous compositions according to the invention, but it is also believed that component (B) may aid more specifically in dissolving and/or swelling some part of the residues from molding that are to be removed during a process according to the invention. Whatever its actual function(s), component (B) preferably is present in a composition according to the invention in an amount such that the ratio of the amount of component (B) to the amount of component (A) in any volume of the composition is at least, with increasing preference in the order given, 0.01:1.0, 0.03:1.0, 0.05:1.0, 0.07:1.0, 0.09:1.0, 0.11:1.0, 0.13:1.0, 0.15:1.0, 0.17:1.0, or 0.19:1.0 and independently preferably is not more than, with increasing preference in the order given, 1.0:1.0, 0.8:1.0, 0.70:1.0, 0.60:1.0, 0.50:1.0, 0.40:1.0, 0.35:1.0, 0.30:1.0, 0.27:1.0, 0.24:1.0, or 0.21:1.0.

Sequestering or chelating agent component (C) preferably is selected from the group consisting of organic molecules that include at least two moieties each selected from the group consisting of carboxyl, carboxylate, and hydroxyl, said two moieties being separated from each other within said molecules by at least two other atoms in said molecules that are not part of either of said moieties. More preferably, component (C) is selected from the group consisting of citric, malic, gluconic, and heptogluconic acids, ethylene diamine tetra-acetic acid (hereinafter usually abbreviated as "EDTA"), nitrilotriacetic acid (hereinafter usually abbreviated as "NTA"), the water soluble salts of all of these acids, and glucono lactone. Salts, particularly alkali metal salts, more particularly the sodium and potassium salts, are usually preferred over the corresponding acids, in order to avoid substantially decreasing the pH values of the compositions. The sodium salt of EDTA is most preferred.

The mechanism of action of the sequestering agent is not known, but it has been found that cleaning power is generally inadequate when this ingredient is omitted from the compositions. In particular, it is preferred that component (C) should be present in a composition according to the invention in an amount such that the ratio of the amount of component (C) to the amount of component (A) in any volume of the composition is at least, with increasing preference in the order given, 0.0010:1.0, 0.0030:1.0, 0.0050:1.0, 0.0070:1.0, 0.0090:1.0, 0.011:1.0, 0.013:1.0, or 0.015:1.0 and independently preferably is, primarily for reasons of economy, not more than, with increasing preference in the order given, 0.10:1.0, 0.080:1.0, 0.070:1.0, 0.0600:1.0, 0.050:1.0, 0.040:1.0, 0.035:1.0, 0.030:1.0, 0.025:1.0, 0.021:1.0, 0.019:1.0, 0.017:1.0, or 0.016:1.0.

Optional component (D) of surfactant is not generally needed in a composition according to the invention in order to obtain adequate wetting of the mold surface to be cleaned, and when not needed is preferably omitted, because having it present promotes an undesirable tendency of the compositions to foam when used for actual cleaning. If a surfactant is needed in some particularly difficult instance, alkyl phenol ethoxylate or alcohol ethoxylate non-ionic surfactants, with the latter having less foaming tendency, are suitable but should be used in the minimum concentration possible to obtain wetting of the surface to be cleaned.

Optional components (E) and (H) as described above also are generally not needed or advantageous, but may be used for exceptionally difficult to clean surfaces: component (E) to achieve higher pH values than are readily obtainable from amines as the only alkalinizing agent and component (H) to swell or dissolve extremely non-polar constituents of the residues. (Caution should be exercised when adding component (E) to compositions expected to come into contact with elastomeric silicone polymer gasketing material, because inorganic alkaline materials such as these may promote chemical attack on such materials.) Optional colorant component (F) has no known technical effect but may be advantageous in some instances for identification purposes. Optional hydrotroping component (G) is ordinarily not needed unless the composition contains substantial concentrations of strongly alkaline materials such as alkali metal hydroxides, which can reduce the solubility of amines and some surfactants so much that the compositions separate into two phases, especially at elevated temperatures. In such instances, a conventional hydrotrope would advantageously be added, in an amount sufficient to raise the cloud point of the composition above the expected use temperature. Suitable hydrotropes include salts, preferably alkali metal salts, of cumene and xylene sulfonic acids and of partial esters of sulfuric and phosphoric acids with alcohols, particularly those made by ethoxylating alkyl phenols. Sodium cumene sulfonate is most preferred.

One group of preferred concentrate composition embodiments of the invention contain the same ingredients as specified above for working compositions, but have a concentration of component (A) that is four times greater than that shown above for working compositions.

Metal mold surfaces to be cleaned according to the invention are often in practice adhered to elastomeric gasketing/sealing materials that usually are constituted of a silicone polymer. Working compositions and processes according to the invention preferably do not swell, dissolve, deplasticize, and/or otherwise damage such gasketing materials, and if prepared from the most preferred ingredients specified above in the most preferred amounts and proportions normally will not cause any such damage.

In a process according to the invention, a metal surface bearing molding residues is contacted with a composition according to the invention for a sufficient time at a sufficient temperature to effect the degree of cleaning needed. Normally, the temperature of the working composition according to the invention during contact with a surface to be cleaned preferably is at least, with increasing preference in the order given, 20, 25, 30, 33, 35, 37, 39, 41, or 43° C., primarily because the cleaning action is faster at higher temperatures (at least within this range). Independently, primarily for reasons of economy, the temperature of a working composition according to the invention during contact with a surface to be cleaned preferably is not more than, with increasing preference in the order given, 80, 70, 60, 55, or 50° C. When the temperature is within the preferred range, the time of contact normally need not be greater than 5 minutes to achieve thorough cleaning. Still less contact time may often suffice and is generally preferred for economic reasons if the cleaning accomplished is adequate; more particularly, the contact time, primarily for reasons of economy, preferably is not more than, with increasing preference in the order given, 4, 3, 2, 1.5, 1.0, or 0.5 minutes.

The invention may be further appreciated by consideration of the following examples and comparative examples.

Concentrate Compositions

Concentrates, not all of which are according to the invention, were prepared from the ingredients shown in Table 1 below. The ingredients other than water were added to water or the previous mixture of water with earlier added ingredient(s) shown, with shaking or stirring after the addition of each ingredient. (The order of addition appeared to make no difference in the product.) The final product was an optically clear, apparently single phase, solution in each instance.

WORKING COMPOSITION AND PROCESS
EXAMPLES AND COMPARSION EXAMPLES

Group W-1

Several drops of each of Concentrate Compositions 1 and 2 from Table 1 were placed on a nickel mold surface that had accumulated residue by use in 200–300 repeated moldings of automobile dashboard covers, using a conventional PVC molding composition including plasticizer(s), stabilizer(s), and mold release agent(s) in addition to its PVC resin(s). Some of the drops were rinsed after one minute of contact with the metal surface and some after two minutes of contact. In either instance, after rinsing with deionized water and drying by blowing with compressed air, the area of contact between the metal and the compositions according to the invention appeared completely cleaned of the residue that had formerly been present on it; residue was still present on the remainder of the surface that had not been contacted with any composition according to the invention.

the same metal mold surface as described for Group W-1, and testing in the same way. Little or no cleaning was observed. Then 1% of Versene™ 100 was added to a portion

TABLE 1

| Ingredient | % of Ingredient in Concentrate Number: | | | | | | | | |
|---|---|---|---|---|---|---|---|---|---|
| | 1 | 2 | 3 | 4 | 5 | 6 | 7 | 8 | 9 |
| EGMBE | 26.6 | — | — | — | — | — | — | — | — |
| DPGMME | — | 26.6 | 26.6 | 26.6 | 25.0 | 25.0 | 75.0 | 48.8 | 48.8 |
| TEA (85%) | 5.80 | 5.80 | 5.80 | 5.80 | 5.80 | 5.80 | 17.4 | 11.3 | 11.3 |
| Versene ™ 100 | 1.0 | 1.0 | — | 1.0 | 0.9 | 0.9 | 2.7 | 1.9 | 1.9 |
| Triton ™ N-101 | 0.50 | 0.50 | — | — | — | — | — | — | — |
| Tergitol ™ NP-9 | — | — | 0.50 | 0.50 | 0.50 | 0.10 | 0.30 | 0.20 | — |

| Ingredient | % of Ingredient in Concentrate Number: | | | | | | | |
|---|---|---|---|---|---|---|---|---|
| | 10 | 11 | 12 | 13 | 14 | 15 | 16 | 17 |
| DEGMBE | — | — | — | — | 38.0 | 19.1 | 23.1 | 23.1 |
| DPGMME | 48.8 | 48.8 | 48.8 | 48.8 | — | — | — | — |
| TEA (85%) | 11.3 | 11.3 | 11.3 | 11.3 | 2.4 | — | — | — |
| KOH (45%) | — | — | — | — | — | 0.90 | 0.84 | — |
| Versene ™ 100 | 1.9 | 1.9 | 1.9 | 1.9 | 1.0 | 0.50 | 0.47 | 0.47 |
| D-Limonene | — | — | — | — | 1.0 | 0.50 | — | 0.47 |
| Triton ™ N-101 | — | — | — | — | 0.50 | 0.30 | 0.24 | 0.24 |
| Stepantex ™ DA-6 | 0.1 | 0.25 | — | — | — | — | — | — |
| Rhodasurf ™ DA 630 | — | — | 0.1 | — | — | — | — | — |
| Alkali Surfactant JEN 2700 ™ | — | — | — | 0.5 | — | — | — | — |

Notes for Table 1
"EGMBE" means "ethylene glycol monobutyl ether"; "DPGMME" means "dipropylene glycol monomethyl ether"; "TEA (85%)" means a mixture of 85% triethanol amine and 15% water; "KOH (45%)" means an aqueous solution of potassium hydroxide containing 45% of potassium hydroxide; "DEGMBE" means "diethylene glycol monobutyl ether"; the balance to 100% for each composition number shown was water; and the entry "—" in a cell of the table indicates that none of the ingredient in the leftmost column in the same row was added to the composition with the number shown above the entry.
Versene ™ 100 chelating agent was commercially supplied by Van Waters & Rogers Inc. of Kirkland, Washington and reported by its supplier to be a solution in water of the following ingredients in the amounts shown for each ingredient: tetrasodium salt of ethylene diamine tetraacetic acid, 37%; disodium ethylenediamine diacetate, 1%; trisodium ethylenediamine triacetate, 1%; trisodium nitrilotriacetate, 1%; sodium hydroxide, 1%; and sodium glycolate, 3%.
Triton ™ N-101 was commercially supplied by Union Cabide Corporation and reported by its supplier to be about 100% ethoxylated nonyl phenol nonionic surfactant with an HLB value of 13.4.
Tergitol ™ commercially supplied by Union Carbide Corporation and reported by its supplier to have the same characteristics as Triton N-101 except that its HLB value is 12.9.
Stepantex ™ DA-6 was commercially supplied by Stepan Co. and reported by its supplier to be 100% isodecyl alcohol ethoxylate nonionic surfactant with an HLB value of 12.8.
Rhodasurf ™ DA-630 was commercially supplied by Rhone-Poulenc and reported by its supplier to be decyl alcohol ethoxylate nonionic surfactant.
Alkali Surfactant JEN 2700 ™ was commercially supplied by Tomah Chemical Products, Milton, Wisconsin and reported by its supplier to be a solution in Water of about 35% of its surfactant ingredient, the mono sodium salt of iso-decyloxypropylaminodipropionic acid, an amphoteric surfactant.

This test shows that sufficiently concentrated compositions according to the invention can act effectively as working compositions according to the invention at normal ambient temperature in a short time. Such concentrated compositions are, of course, fairly expensive compared to more dilute working compositions according to the invention shown below.

Concentrate 2 from Table 1 was also diluted 1:1 with distilled water to form a working composition according to the invention and tested in the same way as for the undiluted concentrate composition, along with a comparison working composition consisting of 4.8% of triethanolamine only in water. The working composition according to the invention was effective in cleaning within 1 minute, while the comparison working composition appeared totally ineffective in cleaning within this time.

Group W-2

A comparison working composition was tested by placing drops of Concentrate 3 from Table 1 on still soiled areas of of Concentrate 3, thereby forming a modified composition that is according to the invention. Drops of this modified composition according to the invention were effective in cleaning in a test as described for Group W- 1, both at full strength and after dilution 1:1 with distilled water.

Group W-3

Concentrate 5 from Table 1 was heated to a temperature within the range from 43 to 48° C. and tested as a working composition according to the invention by pouring a volume of it sufficient to fill approximately one quarter of a full size working mold that had become coated with residue by molding automobile dashboard covers from a conventional PVC based molding composition for that purpose, the composition including plasticizer(s), stabilizer(s), and mold release agent(s) in addition to its PVC resin(s). After 5 minutes of contact time, this cleaning composition was pumped out, and the mold was rinsed twice, each time with portions of deionized water approximately equal in volume to the amount of cleaning composition that had been used. The mold was then opened and inspected, and it was found that the portion of the mold contacted by the cleaning composition according to the invention had become completely clean insofar as could be determined visually, while the remainder of the mold remained soiled with molding residue. The only disadvantage noted was that the cleaning composition foamed extensively during pumping after it was used.

Group W-4

Working compositions according to the invention were made by diluting portions of each of Concentrates 5 to 8 from Table 1 with three times as much water as Concentrate. All of these working compositions were found to be effective in cleaning when tested in the same manner as for Groups W-1 and W-2. All of them exhibited substantial foaming when tested for that property. However, when Concentrate 9 was used to make a working composition by diluting a portion of it with three times as much water as Concentrate 9, the working composition according to the invention thus prepared foamed only very slightly, and the foam that did form quickly dissipated. Moreover, this working composition appeared to be just as effective in cleaning as those made from Concentrates 5 to 8.

Group W-5

In this group Concentrates 10 to 13 from Table 1 were diluted with water to form working compositions according to the invention containing 25% concentrations of the Concentrates. All were tested for cleaning in the same manner as in Group W-1 and were found to be excellent cleaners. Working compositions made from Concentrates 10 and 12 showed less foaming tendency than the others in this Group and also less foaming tendency than the working composition made from Concentrates 5 to 8 in Group W-4 above, but still more foaming tendency than the working composition made from Concentrate 9 in Group W-4 above.

Material Exposure Tests

Pieces of a conventional silicone elastomer gasketing material that is often adhered to the metallic surfaces of molds that accumulate molding residues were tested in exposure to Concentrates 1, 2, 5, 16, and 17 from Table 1 and also to a Comparison Working Composition that consisted of 0.47% of Versene™ 100, 0.24% of Triton™ N-101, 0.38% of potassium hydroxide, and the balance of water, at temperatures from normal ambient to 71° C. for times up to one week. No evidence of attack on the gasketing material from Concentrates 1, 2, 5, or 17 was visible, but the gaskets exposed to Concentrate 16 and to the Comparison Working Composition, both of which contain potassium hydroxide, did show visual evidence of attack.

At least one of (i) nickel powder, (ii) solid macroscopic nickel surfaces, and (iii) macroscopic nickel surfaces having conventional silicone elastomer gasketing material for use in conjunction with the metallic surfaces of molds that accumulate molding residues adhered to the macroscopic nickel surfaces with an adhesive that is conventional for this purpose, were tested for exposure to Concentrates 5, 14, 15, and 16 from Table 1, at temperatures from normal ambient to 71° C. for times up to one week. There was no visible evidence of attack on the nickel, whether in powder or macroscopic form, by any of the tested Concentrates. Concentrates 5 and 14 did not attack the gasketing material or its adhesive insofar as could be determined by visual inspection, but Concentrates 15 and 16 did attack at least the gasketing and probably its adhesive also, again showing the disadvantage of alkali metal hydroxides.

The invention claimed is:

1. A liquid cleaning composition that, when maintained at a temperature of at least 43° C. removes, by chemical action only, solid residues that have accumulated on metallic molding surfaces that have been repeatedly used for moldina plastic from powder or sheet form into coherent, macroscopic, shaped solid objects when the cleaning composition is contacted with such solid residues in place on said metallic molding surfaces for a time of at least 5 minutes, said liquid cleaning composition consisting essentially of water and:

(A) a component selected from the amount consisting of monoethers of:
   (i) ethylene glycol;
   ii) propylene glycol;
   (iii) butylene glycol; and
   (iv) condensation oligomers of ethylene glycol, propylene glycol, and butylene glycol, said condensation oligomers being defined for the purposes of this specification as molecules that conform to general chemical formula I:

$$HO-(C_xH_{2x}O)_n-C_yH_{2y}-OH \qquad (I),$$

wherein x represents one of the integers 2 or 3 and for each $C_xH_{2x}O$ moiety may be the same as or different from its value in any other $C_xH_{2x}O$ moiety in the general formula; y represents one of the integers 2 or 3; and n represents one of the integers from 1 to 5, said component being further selected from molecules having a total of from 4 to 15 carbon atoms;

(B) a component of amine molecules that are selected from molecules containing at least one $HO-C_xH_{2x}$- moiety, where z is an integer not greater than 10, said moiety being bonded to a nitrogen atom; and (C) a component of molecules that are sequestering agents for metal ions, said sequestering agent molecules being selected from the group consisting of organic molecules that include at least two moieties per molecule, each of said moieties being selected independently from the group consisting of carboxyl, carboxylate, and hydroxyl moieties, said two moieties being separated from each other within said molecules by at least two other atoms in said molecules that are not part of either moiety; and, optionally, one or more of the following components;

(D) a component of surfactant molecules that are selected from the group consisting of alkylphenol ethoxylate and alcohol ethoxylate non-ionic surfactants and are not part of any of the previously recited components;

(E) a component of alkaline inorganic salts selected from the group consisting of hydroxides, phosphates and acid phosphates (including condensed phosphates and acid condensed phosphates), borates and acid borates (including condensed borates and acid condensed borates), carbonates and acid carbonates, and silicates and acid silicates (including condensed silicates and acid condensed silicates) of hydroxylamine, hydrazine, ammonia, alkali metals, and alkaline earth metals;

(F) coloring agents; and (G) organic compounds that are liquid at 25° C. under normal atmospheric pressure and are not part of any of the previously recited components, wherein:

there is an amount of component (A) that constitutes at least about 1% of the total liquid cleaning composition;

there is an amount of component (B) having a ratio to the amount of component (A) in any specified amount of the total composition that is from about 0.03:1.0 to about 1.0:1.0: and there is an amount of component (C) having a ratio to the amount of component (A) in any specified amount of the total composition that is from about 0.0030:1.0 to about 0.10:1.0.

2. A liquid cleaning composition according to claim 1, wherein:

(A) the amount of component (A) constitutes from about 5.0 to about 40% of the total liquid cleaning composition;

(B) the ratio of the amount of component (B) to the amount of component (A) in any specified amount of the total composition is from about 0.05:1.0 to about 0.70:1.0; and (C) the ratio of the amount of component (C) to the amount of component (A) in any specified amount of the total composition is from about 0.0050:1.0 to about 0.070:1.0.

3. A liquid cleaning composition according to claim 2, wherein:

(1) component (A) is selected from monoethers of molecules conforming to general formula I when (i) n is not more than 3, (ii) x is either 2 or 3, and (iii) y is either 2 or 3;

(2) component (A) is selected from molecules having a total of from 6 to 12 carbon atoms;

(3) component (B) is selected from molecules containing at least one HO—$C_zH_{2z}$-moiety and z is not greater than 5; and (4) component (C) is selected from organic molecules that include at least two moieties selected from the group consisting of carboxylate and hydroxyl in each molecule, said two moieties being separated from each other within said organic molecules by at least two atoms in said molecule that are not part of either carboxyl, carboxylate, or hydroxyl moiety.

4. A liquid cleaning composition according to claim 3, wherein:

(A) the amount of component (A) constitutes from about 7.0 to about 35% of the total liquid cleaning composition;

(B) the ratio of the amount of component (B) to the amount of component (A) in any specified amount of the total composition is from about 0.09:1.0 to about 0.40:1.0; and (C) the ratio of the amount of component (C) to the amount of component (A) in any specified amount of the total composition is from about 0.0070:1.0 to about 0.040:1.0.

5. A liquid cleaning composition according to claim 2, wherein:

(1) component (A) is selected from monoethers of molecules conforming to general formula I when (i) n is not more than 2, (ii) x is 3, and (iii) y is either 2 or 3;

(2) component (A) is selected from molecules having a total of from 7 to 12 carbon atoms;

(3) component (B) is selected from molecules containing at least two HO—$C_zH_{2z}$—moieties, where z is an integer not greater than 3, and each of said moieties is bonded to a nitrogen atom in the molecules; and (4) component (C) is selected from the group consisting of salts of NTA, EDTA, citric, malic, gluconic, and heptogluconic acids, and glucono-δ-lactone.

6. A liquid cleaning composition according to claim 5, wherein:

(A) the amount of component (A) constitutes from about 7.0 to about 25% of the total liquid cleaning composition;

(B) the ratio of the amount of component (B) to the amount of component (A) in any specified amount of the total composition is from about 0.13:1.0 to about 0.27:1.0; and (C) the ratio of the amount of component (C) to the amount of component (A) in any specified amount of the total composition is from about 0.0090:1.0 to about 0.025:1.0.

7. A liquid cleaning composition according to claim 6, wherein:

(1) component (A) is selected from monoethers of molecules conforming to general formula I when (i) n is 1, (ii) x is 3, and (iii) y is 3;

(2) component (A) is selected from molecules having a total of from 7 to 10 carbon atoms;

(3) component (B) is selected from molecules containing at least two HO—$C_2H_4$-moieties, each of said moieties being bonded to a nitrogen atom in the molecule; and (4) component (C) is selected from the group consisting of alkali metal salts of EDTA.

8. A liquid cleaning composition according to claim 7, wherein:

(A) the amount of component (A) constitutes from about 10.0 to about 18% of the total liquid cleaning composition;

(B) the ratio of the amount of component (B) to the amount of component (A) in any specified amount of the total composition is from about 0.17:1.0 to about 0.24:1.0; and (C) the ratio of the amount of component (C) to the amount of component (A) in any specified amount of the total composition is from about 0.011:1.0 to about 0.019:1.0.

9. A process of cleaning molding residue from a metal surface that has been used to mold plastic objects, said process comprising contacting the molding residue for a time of not more than 5 minutes with a composition according to claim 8 maintained during the contacting at a temperature of at least about 41° C. and subsequently rinsing with water any portion of the metal surface formerly having thereon the molding residue that was contacted with said composition according to claim 8.

10. A process of cleaning molding residue from a metal surface that has been used to mold plastic objects, said process comprising contacting the molding residue for a time of not more than 5 minutes with a composition according to claim 7 maintained during the contacting at a temperature of at least about 35° C. and subsequently rinsing with water any portion of the metal surface formerly having thereon the molding residue that was contacted with said composition according to claim 7.

11. A process of cleaning molding residue from a metal surface that has been used to mold plastic objects, said process comprising contacting the molding residue for a time of not more than 5 minutes with a composition according to claim 6 maintained during the contacting at a temperature of at least about 30° C. and subsequently rinsing with water any portion of the metal surface formerly having thereon the molding residue that was contacted with said composition according to claim 6.

12. A process of cleaning molding residue from a metal surface that has been used to mold plastic objects, said process comprising contacting the molding residue with a composition according to claim 5 and subsequently rinsing with water any portion of the metal surface formerly having thereon the molding residue that was contacted with said composition according to claim 5.

13. A process of cleaning molding residue from a metal surface that has been used to mold plastic objects, said process comprising contacting the molding residue with a composition according to claim 4 and subsequently rinsing with water any portion of the metal surface formerly having thereon the molding residue that was contacted with said composition according to claim 4.

14. A process of cleaning molding residue from a metal surface that has been used to mold plastic objects, said process comprising contacting the molding residue with a composition according to claim 3 and subsequently rinsing with water any portion of the metal surface formerly having thereon the molding residue that was contacted with said composition according to claim 3.

15. A process of cleaning molding residue from a metal surface that has been used to mold plastic objects, said process comprising contacting the molding residue with a composition according to claim 2 and subsequently rinsing with water any portion of the metal surface formerly having thereon the molding residue that was contacted with said composition according to claim 2.

16. A process of cleaning molding residue from a metal surface that has been used to mold plastic objects, said process comprising contacting the molding residue with a composition according to claim 1 and subsequently rinsing with water any portion of the metal surface formerly having thereon the molding residue that was contacted with said composition according to claim 1.

* * * * *